July 20, 1943.  G. A. RUBISSOW  2,325,019

METHOD FOR MOLDING BY PULSATING CENTRIFUGAL FORCE

Filed March 14, 1939  3 Sheets-Sheet 1

Inventor.

George A. Rubissow.

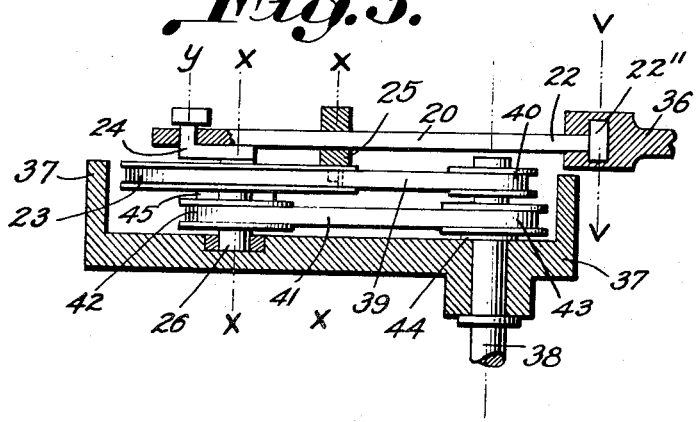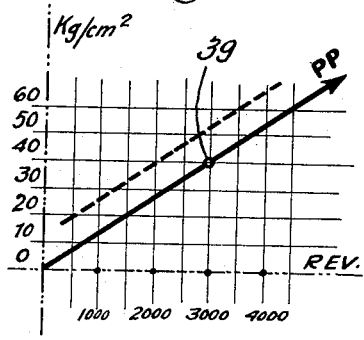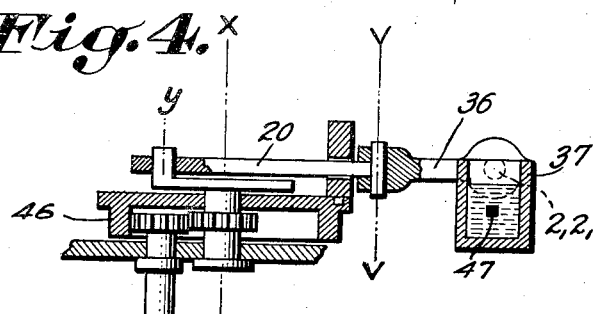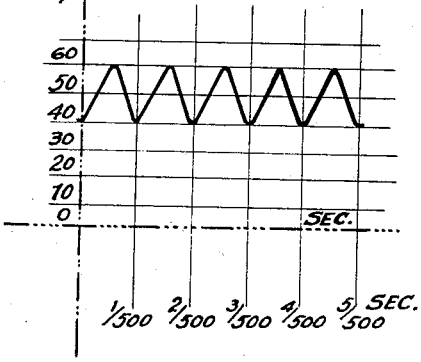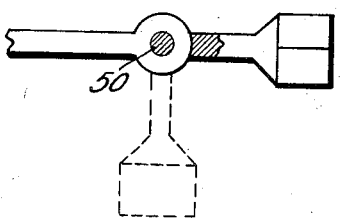

July 20, 1943.    G. A. RUBISSOW    2,325,019
METHOD FOR MOLDING BY PULSATING CENTRIFUGAL FORCE
Filed March 14, 1939    3 Sheets-Sheet 3
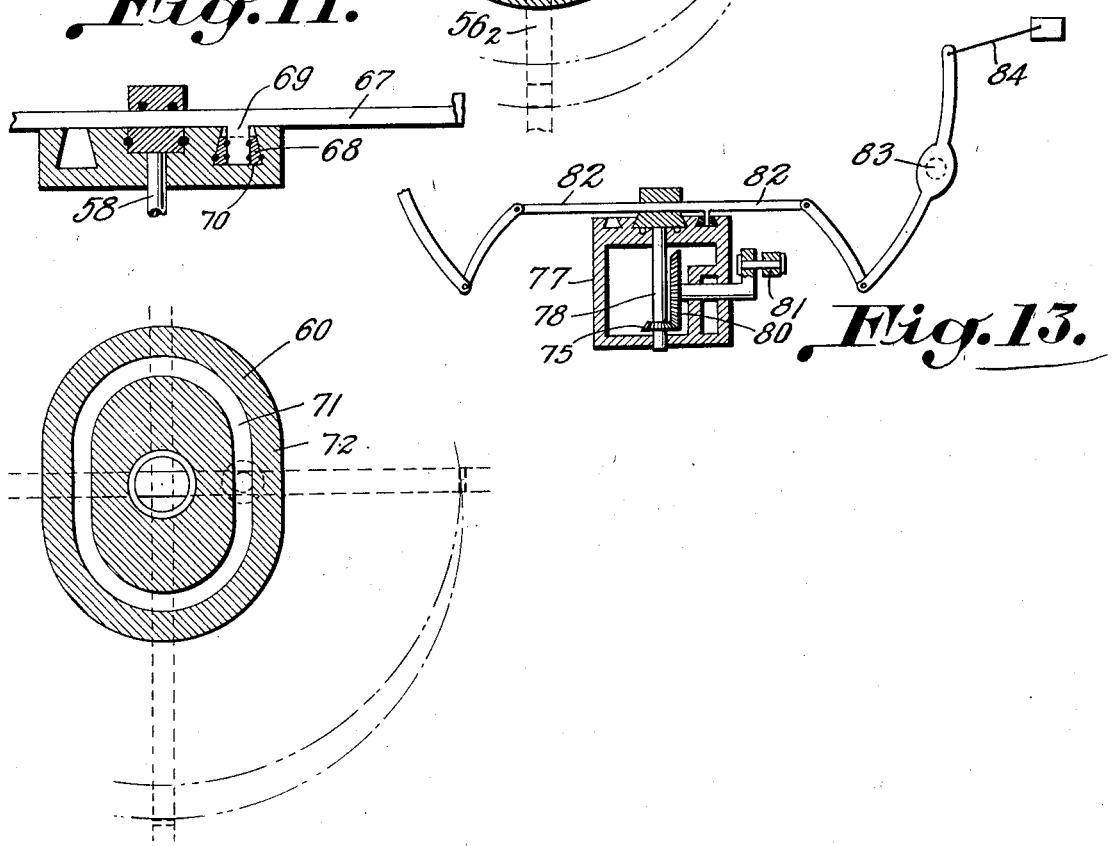
Inventor.
George A. Rubissow.

Patented July 20, 1943

2,325,019

UNITED STATES PATENT OFFICE 2,325,019

METHOD FOR MOLDING BY PULSATING CENTRIFUGAL FORCE

George Alexis Rubissow, New York, N. Y.

Application March 14, 1939, Serial No. 261,860

2 Claims. (Cl. 18—58)

This invention provides a method of using centrifugal force in such a way that when an action due to centrifugal force is caused on the matter submitted to it, this action is not maintained as a constant one for a predetermined number of revolutions per minute, but does vary periodically from a suitable minima to a suitable maxima according to the structure of the device.

It is known to use centrifugal force for many different applications but as it has been employed up to now, it depended only on the number of revolutions per minute, from the length of the rotary arms, and the duration of application of the centrifugal force.

Another aspect of this invention provides new methods of treatment of different materials when using the before-mentioned devices; for instance: the centrifugal casting of solids by means of this method; the treatment of solids especially metal, metal alloys and plastic, when said solids are subjected in molten state and/or during a part of their solidification to this method; the crystallization of solids from the solutions in which they are dissolved by said method; subjecting of blood, urine, etc., different serums and the like to this method; the galvano-plastic under said method and in particular the application of said method in relation to U. S. patent application Serial No. 228,952.

While these methods constitute separate aspects, they all have the same characteristics: the use of pulsating centrifugal force. When speaking about it in this specification it will be called by the abbreviation PAD$_{icf}$—namely, "Periodically augmentable and diminishable (i. e., pulsating) influences of centrifugal force."

There may be different types of devices built to produce these PAD$_{icf}$. Such devices may be employed for aspects of methods as before-mentioned as well as for many other purposes such as parts of engines where the application of PAD$_{icf}$ is desirable or for different toys where the phenomena of the PAD$_{icf}$ may be used.

This device may be particularly used in combination with the patent application "Method and devices for forced takeoff and forced landing of aeroplanes and air-ships," filed simultaneously with this specification in the U. S. Patent Office.

For the convenience of the further description of this invention the following abbreviations will be used:

N=number of revolutions per minute of the treated material or of the device subjected to such revolutions.

$n$=number of revolutions per second or number of pulsations or periodical variations between the maximum and minimum pressures created by the PAD$_{icf}$.

Remark: The "N" are per minutes and "$n$" are per seconds.

$R_{min}$ is the distance between the axle of rotation and the upper surface of the material, i. e., when the upper surface is in the nearest position relative to the axle of rotation.

$R_{max}$ is the distance in millimeters between the axle of rotation and the upper surface of material, when the upper surface is in its furthest position relative to the axle of rotation.

H is a radial thickness of the material measured in millimeters between the upper and lower surfaces of the material under treatment.

Remark: If the radial thickness H of the material is greater than one centimeter then there really exists a surface at a distance of ($R_{max}$+1) cm. If however, H is smaller than one centimeter then this surface is an imaginary one, because ($R_{min}$+1) cm.<($R_{min}$+H) cm.

CIF—centrifugal force or influence of the centrifugal force.

P$_{icf-max}$ is a maximum pressure created during the action of PAD$_{icf}$.

P$_{icf-min}$ is a minimum pressure created by PAD$_{icf}$. The pressures are measured at their respective distances, i. e., on the imaginary surface situated at one centimeter below the upper surface of the material, such imaginary surfaces are situated at a distance: ($R_{min}$+1) cm. for P$_{icf-min}$ and ($R_{max}$+1) cm. for P$_{icf-max}$.

The above and further objects and novel features will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views, Figure 1 is a schematical view of how PAD$_{icf}$ are created.

Figures 3 and 4 are cross-sectional views of the device which may be used according to this invention.

Figure 5 is a diagram showing one among several aspects where the device conforming to Figure 4 produces the $PAD_{icf}$.

Figure 6 represents diagrammatically the $P_{icf-max}$ and $P_{icf-min}$.

Figure 7 represents the periodicity of $P_{icf-max}$ and $P_{icf-min}$, for a chosen point of Figure 6.

Figure 8 represents a side view with parts broken out of a suspension of the container to the rotating arm.

Figures 9 and 11 represent a cross-sectional view of one other aspect of the device. Figures 10 and 12 represent a cross-sectional top view of Figures 9 and 11.

Figure 13 represents schematically a toy arrangement provided with the device.

Figure 1:
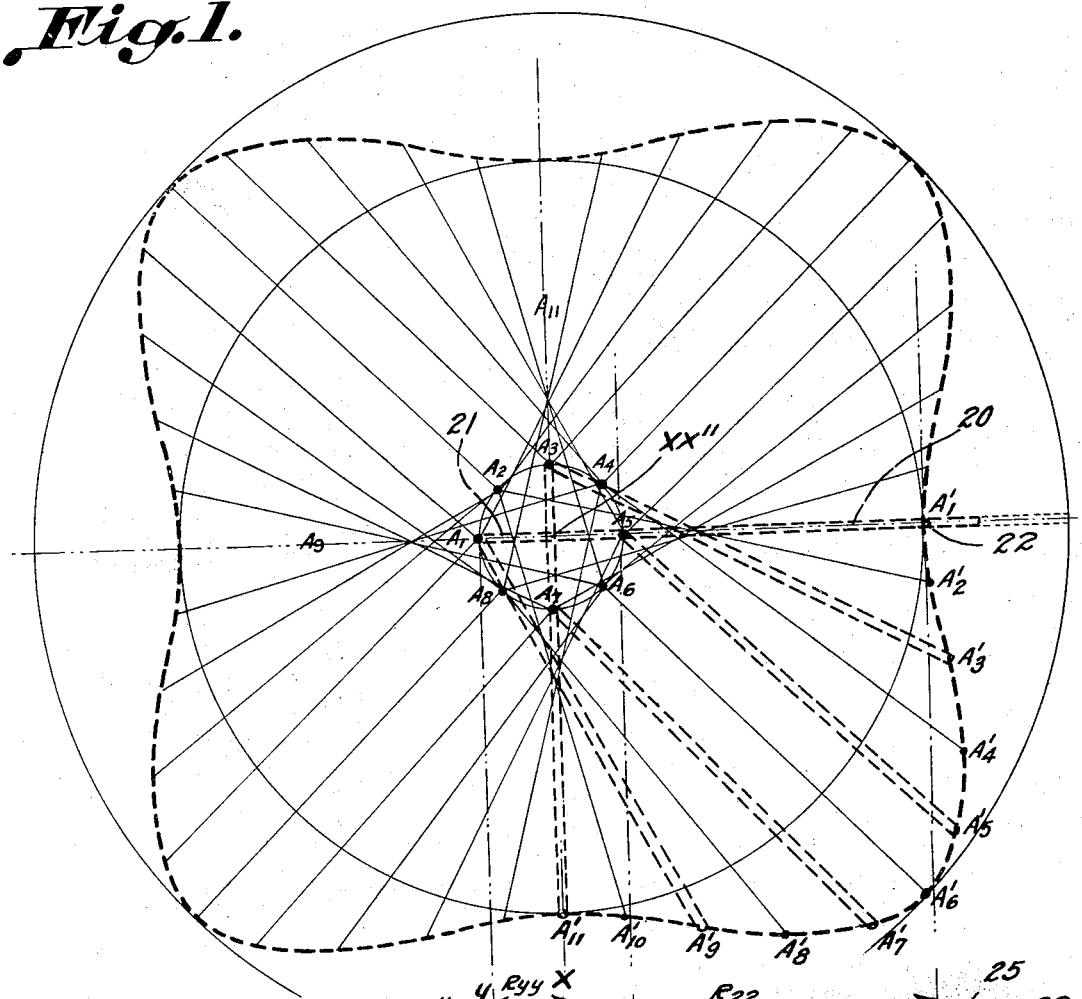
Figure 2:
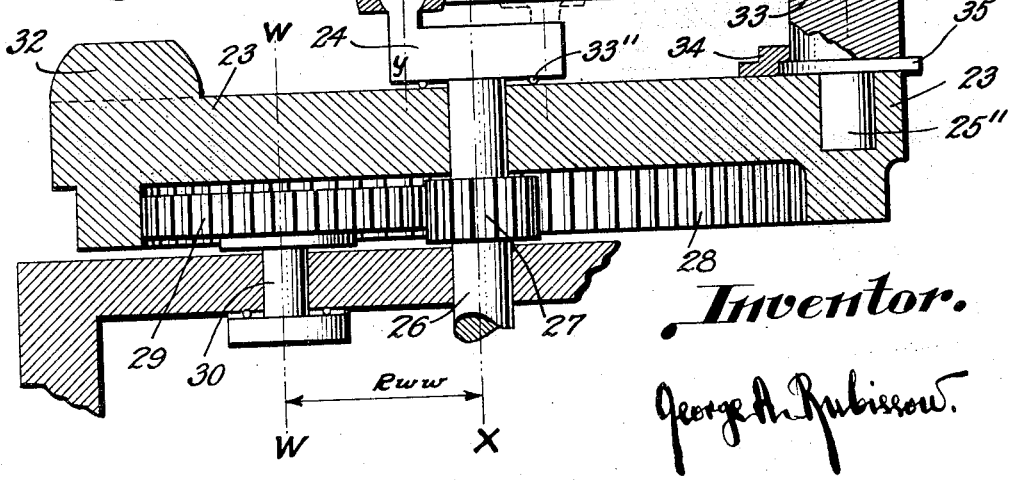
Figure 2 is a cross-sectional view of one of the devices corresponding to the diagram as per Figure 1.

One of the most important aspects of this invention, is the choice of how many times during a second the subjected material should be submitted to the $PAD_{icf-max}$ and $PAD_{icf-min}$ variations of the ICF, i. e., periodical acceleration and deceleration (of $PAD_{icf}$) in radial direction. In Figures 1 and 2 the lever arm 20 is shown schematically in its position corresponding to $P_{icf-min}$. One end of this arm 21 is articulated or attached pivotally around the point $A'_1$. On the other end of the arm $A''_1$ is attached directly or through the intermediary of another lever arm (not shown in Figs. 1 or 2) to a container of any form in which the material is treated or is attached to any desirable devices or bodies to be subjected to $PAD_{icf}$.

The center XX'' is a common center for both the rotation around the axis XX of the articulated end of the arm 21 $A_1$ as well as the rotating of the driven-drum 23 or the like around same axle XX on which driven-drum 23 or the like the arm 20 is not rigidly affixed. When the pulsating device 24 is rotated around the axle XX then the end 22 $A''_1$ of the arm 20 is moving back and forth and/or up and down in relation to the center of rotation XX''. The end 21 of arm 20 being articulated by suitable axis 24'' can displace themselves simultaneously around the said axles YY and XX. The other end 22 of arm 20 is guided by a guiding member 25, which guiding member is itself pivotally attached or articulated by means of an axis 25'' passing through the axle ZZ, said guiding member 25 forming one body with the driven-drum 23. When the driven-drum 23 is rotated around the axle XX said driven-drum 23 also rotates together with itself the guideway 25 attached on it. The arm 20 is forced to following by its end 22 in guideway 25 all the movement of the driven-drum, i. e., the arm 20 is rotated simultaneously with the driven-drum; at the same time the same arm 20 is continuously pushed backward and forward provided that its other end is rotated with an appropriate speed around the axles YY and XX. This is easily realized by means of forced connections such as for instance, gears, belts, chains or the like.

In Figure 2, the pulsating device 24 is rigidly attached to the axis 26 on which axis is rigidly attached the gear 27. The driven-drum 23 is provided on its suitable part with teeth 28 of the same character as the teeth of gear 27. Gear 28 is connected with gear 27 not directly but through the intermediary of gear 29, having the same form of teeth as 27 and 28. Gear 29 is mounted on an axis 30 and both axes 30 and 26 are mounted on the same supporting frame 31. When the driven-drum 23 is rotated by the gear 29 this gear 29 also rotates the gear 27 and therefore rotates the pulsating device 24.

The shaft 26 is driven by means of a motor or the hand or foot of a man.

The choice of relationship of the respective numbers of teeth of gears 27, 28, and 29 provides the required $P_{icf-max}$ and $P_{icf-min}$.

On Figure 1, by way of example, only one such is shown.

The point $A_1$ is displacing around the axles YY and XX in such relationship that when the driven-drum 23 makes one revolution, the pulsating device 24 at the same time makes five revolutions. Therefore we obtain four pulsations, i. e., four $P_{icf-max}$ and four $P_{icf-min}$ for one revolution. The arm 20 goes from its position $A_1$—$A''_1$ after the pulsation device 24 has turned 45° in position $A_2$—$A''_2$ after 90° in position $A_3$—$A''_3$ and so forth, and when $A_1$ arrives after 360°+90° in the point $A_{11}$ then the arm takes the position $A_{11}$—$A''_{11}$; that means returns to the point $A_3$. The end $A_1$ or 22 on Fig. 2 of the arm 20 is chosen to coincide with the axle ZZ, this only for the convenience of the description and not binding for other varieties.

In Figure 2, the driven-drum 23 is provided with a balancing mass 32 to balance the mass of the guide-member 25 etc., the said guide-member being provided with an axis 25''; bearing 33 being preferably in the slit to facilitate the sliding frictional engagement of the arm 20. To prevent the guide-member 25 from becoming disconnected, a supporting frame 34 is used; the axis 25'' is provided with a suitable ring 35. Suitable bearing arrangements, ball bearing 33'' or others may be provided between the drum 23 and the pulsating device 24, as well as in places where the gears 27 and 29 are mounted on the frame 35. Supposing $R_{yy}$ is the radius of rotation of the treated material or matter and $R_{zz}$ is the radius of rotation of the axle ZZ around the axle XX, then it should be noted that one of the important aspects of this invention is the choice of the relationship of the dimensions of $R_{yy}$ and $R_{zz}$, when simultaneously choosing the necessary relationships between the gears 27, 28, 30 and/or the like.

The choice of the place of the axle WW, around which the gear 29 is rotated, in relation to XX, that means the distance $R_{ww}$ jointly with the choice of the radius $R_{zz}$ of the gear 27 and the radius $R_{28}$ of gear 28 are the important arguments characterizing the device and the method.

In Figure 3, another aspect of the device is shown wherein the arm 20 is pivotally attached to the pulsation device 24 and the other end 22 of arm 20 is rigidly extended and forms an axis 22'' passing through axle VV parallel to axle XX around which axle VV another intermediary arm 36 is mounted pivotally; on which other end of this intermediary arm 36 is also pivotally mounted the container for the material, or the device to be subjected (not shown in Fig. 3).

37 is a rigid supporting frame not rotatable. 38 is the driving shaft actuated by means of a motor, by hand or other means. 23 is the driven drum on which the guide means 25 are affixed. Instead of gear arrangement as shown in Figure 2, a belt arrangement is shown in Figure 3, wherein the belt 39 is mounted on drum 23 and the wheel 40 and the belt 41 is mounted on wheels 42 and 43; said wheels 42 and 43 being rigidly attached to the shaft 26 of the pulsating device 24. Both wheels 40 and 43 are rigidly attached to the same driving shaft 38, 44 and 45 being suitable bearing arrangements.

Figures 4 and 5 illustrate another aspect similar to Figure 2, wherein, however, the arm 20 is extended for appropriate lengths. The axle VV is parallel to the rotating axle XX, and on said axle VV, is mounted pivotally or by articulated means the lever-arm 36 on the other end of which lever-arm 36 is mounted pivotally the container of the material to be treated. The axle around which the container is pivoting $Z_1Z_1$ is perpendicular to the radius of rotation, when the apparatus is in rotation.

In Figure 5 by way of example, the arm 20 is pulsated only three times during one revolution of the container around the axle XX, as it is shown by the corresponding B—B'' positions. For instance, when the container 37 is in the position $B_1$—$B''_1$ we see that the position of the arm 20 is coinciding with the radius of rotation around XX. Therefore the center of axis of VV and the symmetry axle of the container 37 are coinciding with the said radius of rotation around XX. When the position of the driven drum 46 is so displaced that the arm 20 will occupy a new position $B_3$, i. e. the drum 46 has been turned 45°, then the arm 20 will take the place of $20''_3$, as shown by dotted lines. It is seen that the symmetry axle of the arm $20''_3$ does not coincide with the direction of the radius of rotation $R_{xx}$. However, axis 22 will enable the intermediary arm 36 and the container 37 not to be forced to follow the direction of the position of the lever arm $20''_3$, but will automatically turn around the axle VV in such a way that the symmetry axle of the container 37 will coincide with the radial direction of the centrifugal force corresponding to the moment somewhere between $P_{icf-min}$ and $P_{icf-max}$, i. e., coincide with the radius of the rotation around XX, which could be observed considering the position of the plain black square 47.

In Figure 6, and only by way of example, is shown numerically the lines $P_{icf-min}$ in black, and $P_{icf-max}$ in dotted lines. Supposing $P_{icf-min}=40$ kg./C. and $P_{icf-max}=50$ kg./C at 3,000 revolutions per minute, we obtain then, according to Figure 7, diagrammatic curve of pulsations between $P_{icf-max}$ and $P_{icf-min}$. If the device will be so built that for each revolution of the container around the axle XX there will be 50 pulsations, then as shown in Figure 6, during one second the container makes 50 revolutions and during each revolution ten pulsations, that means 500 pulsations during one second; that means as shown in Figure 7, during 1/500 of a second the material is subjected one time to its maximum and minimum pressures.

In Figure 8, is shown a pivoting arrangement wherein the container can pivot simultaneously around the vertical VV and the horizontal ZZ axles. That means that both axles VV and ZZ are passing through the same center 50. This may simplify construction for different cases, and may replace the axis 22'' and 37'' in one unit.

The same action of $PAD_{icf}$ may be obtained by another aspect such as shown in Figs. 9, 10, 11 and 12. In Figure 9 on a supporting frame 51 is mounted driving shaft 52 which driving shaft could rotate in the supporting frame 51 without rotating the same. Suitable bearing 53 may be provided. On the free end of the shaft 52 is affixed a suitable drum 54. This drum 54 is provided with a slit, the sides of which should be preferably one parallel to another. Through this slit 55 passes the arm 56 which should be of sufficient length. The arm 56 can be a single arm, i. e., to support the matter to be treated only on one of its ends, or it may be shown as in Figure 9, arranged that it supports on both of its ends, the two matters to be treated. The said arm 56 must fit in its appropriate part 56'' exactly in the slit 55 and so arranged that it could easily move forward and backwards in the said slit. Suitable bearing and oiling means could be provided on the sides of this slit to diminish the frictional engagements. When the drum 54 is rotated the arm 56 is rotated simultaneously.

At the arm 56 is provided at a suitable distance from the axle of rotation XX of the shaft 52 a downward rigidly affixed axis 58 on which axis 58 is mounted one or a plurality of rollers or any other suitable bearings.

Figures 9 and 10 show the roller 59 mounted on the axle 58. Between the drum 54 and the supporting frame 51 is mounted rigidly a body provided with cut-out guideways 61 which are so arranged that they could receive the roller 59 during all movements of the said roller around the axle of rotation XX.

The guideways 61 may follow any desirable curve. For instance, an ellipse, a parabola or a combination of curves and straight lines, according to the character of pulsations desired. The roller 59 or any other bearing element replacing it may be provided with suitable oiling means. It may also be mounted on any kind of bearing means.

On Figure 11, the driving shaft 66 is provided with similar arrangement as in Figure 9. The arm 67 is provided, however, with a special conic rolling element 68 which offers additional security, preventing the arm from moving upwards. The said rolling element 68 being mounted on the axle 69 through bearing balls 70.

On Figure 12 there is shown a guideway having the contour 71 of two semi-circles joined together by straight lines 72. Such an arrangement will permit having two pulsations during one revolution of the shaft.

Figure 13 shows a supporting frame 77 in the form of a casing through which the shaft 78 is provided with a gear 79 which gear is contacting another gear 80 when the latter one is rotated by means of a handle 81. The arms 82 are curved upwards and provided with coils 83. The cord 84 comes out of the end of the arm and on its free end is attached the desired matter to be rotated.

Another aspect of this invention is the use of the device described as a screw for boats or aeroplanes and the like. For this application it will be necessary to affix the blade of the screw to the non-articulated end of the arm 20 Figure 2, or arm 67 Figure 11; and this may be done rigidly or pivotally, however limiting exactly the permissible displacements of the screw by suitable arresting means. Such a screw when mounted will give new performances. The blade of the screw is affixed on the arm 20 or 67 between the guideway member 25 and the axle; when said axle is nearest to the guideway member then the fixation should be so made that it should pass over the guide means. The blade may also be affixed on the free end 22 or on its extension. This is the simplest way. Suitable means may be provided to cover the driven drum 23 and all movable and rotatable parts by a separate cap which will diminish the respective frictions of air or liquids on which the devices are supposed to displace themselves.

Instead of one arm 20 or 67 as shown in Figures 2, 3, 4 or 11, a plurality of arms 20 or 67 may be mounted on the same axle YY in Figure 2 or XX in Figure 11, then a corresponding number of guide means 25 or guideways 68 should be provided. Also instead of only one axis YY a plurality of axis YY may be provided on the same pulsating device.

The disclosed drawings have given the most simple schemes of the device. However, the same phenomena of PADicf may be applied, for instance in the following way: Any existing ordinary rotatable device such as used now for centrifugal casting is itself in its entirety submitted to asymmetrical or eccentric (in relation to the axle of rotation) periodical rotations. This may be realized by means of crankshaft-like arrangements or a system of eccentric devices (not shown in drawings). Instead of one arm, several arms may be attached to the same axis 24''. It may be remarked that the pulsating device 24 as shown for example on Figure 3 may be located so that its axle YY will not turn around axle XX but around another axle placed at a certain distance from XX and remaining parallel to XX; then the so-created pulsations will be asymmetrically periodical. Also such devices are more complicated to build because they require additional gears or transmissions for their movements.

Another aspect of this invention consists of extending the arm 20 or 67 by flexible connections of any desirable lengths. This may be done in attaching to end 22 of the arm 20 or 67 pivotally or directly, a flexible wire, chain, cord or the like on the end of which the container for the matter or any other device to be rotated is affixed. The said flexible means may be so connected with the supporting frame of the device that their length is changed or before or during the rotation. Such particular devices may provide some new means which may enable the rotation of bodies around the axle XX with very great radius, because the pulsation will maintain and keep the elastic means (cords, wires, chains, etc.) in a taut condition. For example, it is impossible to provide a rigid arm of ten or fifteen meters if a small device should be employed to rotate a toy dirigible. However, the flexible connection will make possible the realization of same with very simple and economical means, employing instead of a heavy arm, suitable wire, cords or the like.

A supporting frame may be affixed on any kind of foundation for instance in the ground, on the wall, on the table, etc. For certain applications it will be important to diminish as much as possible the vibrations generally caused by centrifugal force. This may easily be realized by using elastic, rubber or spring means, interposed between the said supporting frame and the foundation or the like.

Another aspect of this invention consists in the use of the devices as described in combination with washing machines, with different toys such as flying aeroplanes; for boats and rowing machines, for reducing apparatus, concrete or asphalt mixers, etc.

PADicf as described before, during the centrifugal treatment of material, as shown in U. S. Patent applications re ICF, Serial No. 228,952, August 31, 1938, and re OIMS, Serial No. 254,002, February 1, 1939, wherein the ICF is then accordingly to be replaced by PADicf. This method provides excellent results.

This method and apparatus relating to it can also be applied for ordinary centrifugal casting without taking into consideration the beforementioned U. S. patent applications re ICF and OIMS. The application of PADicf to the casted materials even without keeping the said material sufficiently long in the molten state when submitted to the influence of ICF will still provide better casting than ordinary centrifugal casting, because of the intensity of the pulsating centrifugal action.

Having now particularly described and ascertained the nature of my said invention and in what manner the same is to be performed, I declare that what I claim is:

1. A method for treating molten material placed in a mold, comprising placing the said material in the said mold, in a molten state, subjecting for a predetermined length of time the said material in the said mold, to a rotation around an axis exterior of the said mold, and continuously and periodically decreasing and increasing during said rotation, the distances between the said mold and the said axis of rotation whereby the said material is subjected to the influence of the pulsating centrifugal force of the character herein described.

2. A method as set forth in claim 1 wherein the said predetermined length of time is the time necessary for the material to cool, until it at least is incapable of flowing.

GEORGE ALEXIS RUBISSOW.